Patented Dec. 7, 1926.

1,609,793

UNITED STATES PATENT OFFICE.

PIO CACCIA, OF NEW YORK, N. Y.

DIRECT BLUE DISAZO DYESTUFF.

No Drawing.   Application filed September 25, 1925.   Serial No. 58,608.

The object of my invention is the production of a direct color, which can dye the artificial silk only in unions, (mixed in textiles), while the silk will remain white. The artificial silk will be dyed light blue shade when in a bath with soap and sodium carbonate, and navy blue in a bath with Glauber's salt ($Na_2SO_4$).

In carrying out my invention, I boil the "H acid" (1.8-aminonaphthol-3:6-disulfonic acid) with a solution of sodium cyanide and also boil the solution of sodium cyanide with Dahl's acid (2-naphthylamine-5-sulfonic acid), and when boiling I mix the two solutions and then pour into the mixture diazotized benzidine. The smell of hydrocyanic acid disappear and the crystals will be formed with addition of sodium carbonate and sodium chloride. After one night I filter and the dyestuff is dried. The proportion used is 1 mole of "H acid" to 1 mole Dahl's acid to 1 mole of benzidine. The mixture of $Na_2CO_3$ and $NaCl$ can be added directly to the mixture of the two acids.

The direct color is very good to washing and the fastness to light increases with the treatment of sodium cyanide.

In preparing this product I prefer to use the ingredients in about the following proportions: 2 liters of 0.2% sodium cyanide solution; 15 grs. of "H acid" and 15 grs. of Dahl's acid, 2:5; 4 grs. of benzidine sulphate which must be diazotized before use. This color is very soluble in water giving a blue-violet; with $H_2SO_4$ a blue-cobalt; with NaOH a red-purple and with HCl a red-violet.

I claim:

1. A process of making blue disazo dye, which comprises reacting diazotized benzidine with 2-naphthylamine-5-sulfonic acid and 1.8-aminonaphthol-3:6-disulfonic acid in the presence of a soluble cyanide.

2. A process of making blue disazo dye which consists in treating the diazotized benzidine with the mixture of 2-naphthylamine-5-sulfonic acid and 1.8-aminonaphthol-3:6-disulfonic acid in boiling sodium cyanide solution.

3. A process of making blue disazo dye, which comprises treating the diazotized benzidine with the mixture of 2-naphthylamine-5-sulfonic acid and 1.8-aminonaphthol-3:6-disulfonic acid with sodium cyanide solution and crystallizing out the resulting dye.

4. A new blue capable of dyeing artificial silk directly resulting from the combination of diazotized benzidine with 2-naphthylamine-5-sulfonic acid and 1.8-aminonaphthol-3:6-disulfonic acid in presence of cyanide.

5. The blue disazo dye having probably the following formula:

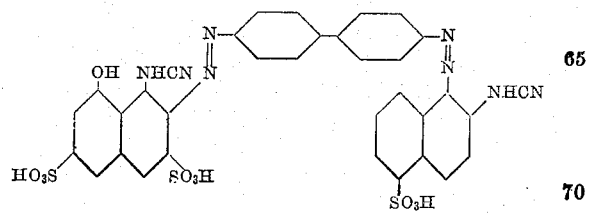

6. Material dyed with the dyestuff of claim 5.

PIO CACCIA.